United States Patent Office 3,063,423
Patented Nov. 13, 1962

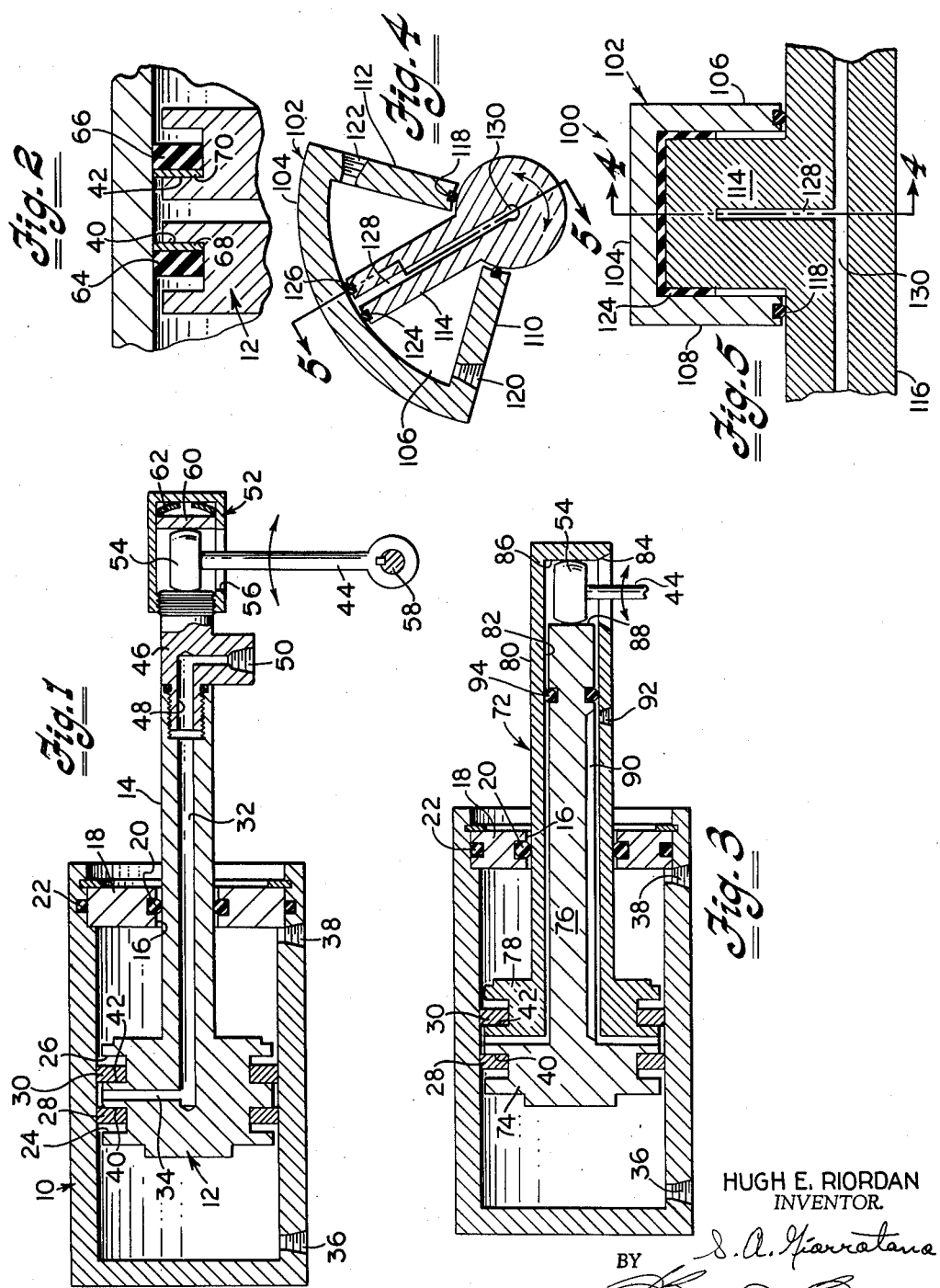

3,063,423
SEAL MEANS FOR HYDRAULIC ACTUATOR
Hugh E. Riordan, Wyckoff, N.J., assignor to General Precision, Inc., Little Falls, N.J., a corporation of Delaware
Filed Aug. 17, 1961, Ser. No. 132,056
3 Claims. (Cl. 121—38)

The present invention relates to double-acting hydraulic actuators, and particularly to a double-acting hydraulic actuator which eliminates lost motion resulting from the shifting of a sealing element.

In a conventional double-acting hydraulic cylinder, the shifting of the piston ring on the piston when the direction of the pressure drop across the piston reverses results in what may aptly be termed as piston ring backlash. For example, when pressurized fluid is introduced into the cylinder on one side of the piston, the piston ring is first shifted in one direction until all play between the piston ring and the piston is completely taken up, and thereafter the piston itself begins to shift. When the pressurized fluid is introduced into the cylinder on the other side of the piston the piston ring is first shifted back in the opposite direction until the play is again taken up before the piston begins to move in the opposite direction. This results in an initial flow of fluid into the cylinder on each stroke which is unaccompanied by piston motion. The effect on the behavior of a mechanical system employing such a hydraulic actuator is the same as if backlash were present in the mechanical connection between the piston rod and its load.

Many high performance installations cannot tolerate such a backlash effect, and employ dual opposed single acting actuators to eliminate piston ring backlash. In such an arrangement a single piston actuated in one direction hydraulically is engaged against one side of a link member, for example, and a similar single acting piston is engaged against the opposite side of the link member in opposed relation to the first piston. With this arrangement, pressurized fluid can be selectively introduced into either of the pistons while the other is connected to tank to shift the link member back and forth without reversing the pressure drop across the piston ring of either of the pistons.

In accordance with one embodiment of the present invention, the reversal of the pressure drop across the piston ring of a double-acting hydraulic cylinder is eliminated by using a pair of piston rings separated by a space which is vented through the piston to prevent pressure from building up between the rings. Thus when pressurized fluid is introduced on one side of the piston, the first piston ring adjacent thereto is urged toward the second piston ring and the second piston ring is simultaneously urged toward the first because of the back pressure of the fluid being forced out of the cylinder on the other side of the piston. Consequently, when the pressurized fluid is introduced on the other side of the piston, the second piston ring is already displaced toward the first piston ring so that the introduction of the pressurized fluid cannot shift it. Of course, as the piston is shifted back by the pressurized fluid, the first piston ring is maintained in its inwardly displaced position by the back pressure of the fluid leaving the cylinder on the one side of the piston. Thus both of the piston rings are at all times preloaded toward one another, to eliminate lost motion between the piston rings and the piston. Any pressurized fluid escaping past the piston rings into the space therebetween is immediately vented as previously described to prevent pressure from building up between the rings.

Accordingly it is one object of the invention to eliminate sealing ring backlash or lost motion in a double-acting hydraulic actuator.

It is another object of the invention to provide a double-acting hydraulic cylinder and piston having a double sealing ring construction with the space between the rings vented in a manner to eliminate reversal of the direction of the pressure drop across each of the rings, thereby eliminating piston ring backlash which would result in a flow of fluid into the cylinder unaccompanied by piston motion.

It is a further object of the invention to provide a rotary vane type hydraulic actuator free of lost motion or backlash.

It is a still further object of the invention to provide a backlash-free mechanical connection between a hydraulic actuator of the type described above and a mechanism to be operated by the actuator.

Further objects and advantages of the present invention will become readily apparent as the following detailed description of a specific embodiment of the invention unfolds and when taken in conjunction with the drawings, wherein:

FIG. 1 is a sectional view of a double-acting hydraulic cylinder and piston embodying features of the present invention;

FIG. 2 is an enlarged fragmentary sectional view illustrating a modification of the present invention employing backed-up O-rings;

FIG. 3 is a sectional view of a hydraulic actuator illustrating a modification of the present invention;

FIG. 4 is a sectional view taken along the line 4—4 of FIG. 5 illustrating a rotary vane-type actuator embodying features of the present invention; and FIG. 5 is a sectional view taken along the line 5—5 of FIG. 4.

Referring to FIG. 1, one embodiment of the present invention comprises a hydraulic cylinder 10 having a piston 12 slidably positioned therein. A piston rod 14 extends from the piston 12 through a central aperture 16 in a wall 18 closing off the right end of the cylinder 10, suitable O-rings 20 and 22 or other suitable type of seal rings being provided to slidably seal the piston rod 14 in the aperture 16 and provide a seal about the periphery of the end wall 18.

A pair of axially spaced annular grooves 24 and 26 are formed in the cylindrical surface of the piston 12 and suitable piston rings 28 and 30 are seated in each of the grooves in position to slidably seal against the inner surface of the wall of the cylinder 10. The piston rod 14 has an axially extending passageway 32 therein opening on the right end thereof, and the left end of the passageway 32 extends into the piston 12 and communicates with a radially extending passageway 34, the outer end of which communicates with the space between the two piston rings 28 and 30. A port 36 is provided in one end of the cylinder 10 in position to introduce pressurized fluid into the cylinder to act on the left face of the piston 12 and a port 36 is provided in the right end of the cylinder in position to introduce pressurized fluid into the cylinder to act on the right face of the piston 12.

With this construction the piston rings 28 and 30 are always preloaded against inner shoulders 40 and 42 of the annular grooves 24 and 26, respectively, to eliminate the possibility of pressurized fluid being introduced into one end or the other of the cylinder without immediate movement of the piston 12. For example, when pressurized fluid is introduced into the cylinder through the port 36, it urges the piston ring 28 against the shoulder 40 and shifts the piston 12 to the right. At the same time the back pressure created by the fluid being forced out through the port 38 urges the piston ring 30 against the shoulder 42. Consequently, when the piston 12 is shifted to the left by the introduction of pressurized fluid through the port 38, the piston ring 30 is already in engagement with the annular shoulder 42 so that the piston is shifted immediately. This eliminates the possibility of a flow of fluid into the cylinder unaccompanied by piston motion as would occur, for example, if the piston ring 30 were not in engagement with the shoulder 42 and the pressurized fluid had to first shift it to the left into engagement with the shoulder before beginning to move the piston 12. Of course, as the piston 12 is shifted to the left by the pressurized fluid introduced through the port 38, the back pressure of the fluid passing out of the cylinder through the port 36 will maintain the piston ring 28 in engagement with the shoulder 40 and since the space between the piston rings 28 and 30 can be vented or connected to tank through the passageways 34 and 32, as will be described in greater detail hereinafter, fluid pressure cannot build up between the rings in a manner to interfere with their being preloaded against the annular shoulders 40 and 42.

To provide a hydraulically actuated mechanism completely free of any backlash, the right end of the piston rod 14 can be connected to a pivoting link member 44, for example, in the following manner. An end fitting 46 having a suitable right-angle passageway 48 therein to communicate the passageway 32 with a vent port 50 on the side of the fitting 46 is threadably connected to the end of the piston rod. A cup-shaped housing 52 is threadably mounted on the right end of the end fitting 46 in position to receive an enlarged truncated ball 54 on the upper end of the link member 44 projecting through an opening 56 in the wall of the housing 52. The lower end of the link member is connected to a shaft 58 to actuate a suitable mechanism (not shown). A spacer 60 preferably backed by a spring washer 62, or the like, firmly preloads the ball 54 against the end face of the fitting 46 in a manner to eliminate all play therebetween. With this construction, the reciprocation of the piston 12 can pivot the link member 44 to actuate the mechanism in a manner completely free of any backlash or lost motion whatsoever.

Referring to FIG. 2, deformable O-rings 64 and 66 or other suitable types of seal rings can also be employed in the hydraulic actuator to slidably seal the piston 12 in the cylinder 10 by providing back-up rings 68 and 70 positioned between the O-rings 64 and 66 or other types of seal rings and the shoulder 40 and 42, respectively, to prevent the O-rings or other types of seal rings from being extruded into the clearance between the cylindrical outer surface of the piston 12 and the cylindrical inner wall of the cylinder 10. It is noted that only one back-up ring need be employed with each O-ring or other type of seal ring since the pressure drop across the seal rings does not reverse.

Referring to FIG. 3, another embodiment of the present invention is illustrated which provides an improved connection between the piston rod and the pivoting link member 44. In the embodiment illustrated in FIG. 1, it is apparent that the spring washer 62 must pre-load the spacer 60 against the enlarged ball 54 with a force greater than the maximum force that will be applied on the ball 54 by the movement of the piston 12 to the left. This is necessary to ensure that the spring 62 will not compress when the piston 12 is shifted to the left, since if it did the actuator would not be completely free of backlash. Because of this there is a rather high friction associated with the spring loaded drive connection of FIG. 1. The embodiment illustrated in FIG. 3 effectively eliminates this friction by providing a two-piece piston and piston rod assembly 72 in place of the one-piece piston and piston rod illustrated in FIG. 1.

The assembly 72 comprises a piston 74 having a piston rod 76 projecting therefrom into the central bore 82 of a second piston 78 and piston rod 80. The piston rod 80 is fitted to the central aperture 16 in the end wall 18 and sealed by the O-ring 20 or other type of seal ring. The enlarged ball 54 on the upper end of the link member 44 is projected through an opening 84 in the end of the piston rod 80 in position to space the blind end 86 of the bore 82 from the right end 88 of the piston rod 76. The size of the enlarged ball 54 is also such as to space the adjacent faces of the pistons 74 and 78 from one another as illustrated. An axially extending vent groove 90 is formed in the piston rod 76 with the right end thereof communicating with a vent discharge port 92 in the wall of the piston rod 80 and the left end thereof communicating with the space between the pistons 74 and 78. In this manner the space between the piston rings 28 and 30 is in communication with the vent discharge port 92 to prevent pressure from building up between the piston rings as previously described. An O-ring 94, or other type of seal ring, is seated on the piston rod 76 and slidably seals against the wall of the bore 82 to prevent fluid from escaping past the vent groove 92 and out through the opening 84. When pressurized fluid is introduced through the port 36, the piston 74 is shifted to the right to shift the link member 44 and the piston 78 therewith. Of course the pressures on the piston rings 28 and 30 preload them against the annular shoulders 40 and 42, as previously described. When pressurized fluid is introduced through the pressure port 38 the piston 78 is shifted to the left and shifts the link member 44 and the piston 74 therewith. Thus in each direction the maximum loading on the ball 54 never exceeds the force required to shift the link member 44 by more than the back pressure on the side of the piston connected to tank.

Referring to FIGS. 4 and 5, a rotary vane type actuator 100 embodying features of the present invention is illustrated which comprises an arcuate shaped housing 102 formed by an arcuate wall 104 in the form of a circular sector, axially spaced segmental end walls 106 and 108 and radially extending walls 110 and 112. A rotary vane 114 projecting from a shaft 116 is positioned within the housing 102 and a sealing element 118 is seated on the edges of the walls 106, 108, 110 and 112 and slidably seals against the cylindrical surface of the shaft 116. The axis of the shaft 116 is positioned at the intersection of the projection of the radial walls 110 and 112 so that the sealing element 118 does no lose contact with the surface of the shaft, and suitable supporting structure (not shown) is provided for maintaining the housing 102 and the shaft 116 in assembled relation. A port 120 is provided in the radial wall 110 to introduce pressurized fluid into the housing on one side of the vane 114 and a port 122 is provided in the radial wall 112 to introduce pressurized fluid on the other side of the vane 114. A pair of spaced sealing elements 124 and 126 are seated and extend along the three edges of the vane 114 to slidably seal against the arcuate circular sector wall 104 and the segmental walls 106 and 108.

A radial passageway 128 is provided in the vane 114 with the outer end thereof communicating with the space between the sealing elements 124 and 126 and the inner end thereof communicating with an axially extending passageway 130 in the shaft 116 to vent the space between the sealing elements in a manner similar to that previously described. With this construction, the rotary vane and shaft 116 can be pivoted in a clockwise direction as viewed in FIG. 4 by the introduction of pressurized fluid through the port 120 and pivoted in a counter-clockwise direction by the introduction of pressurized fluid through the port 122, and the sealing elements 124 and 126 will at all times be preloaded inwardly to ensure that fluid will not be introduced into the housing without an accompanying pivotal movement of the vane and shaft. Consequently the shaft 116 can be connected to hydraulically actuate a suitable mechanism without backlash.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims. For example, the invention can readily be applied to and is equally effective in eliminating backlash from passive hydraulic devices such as dampers and dashpots.

What is claimed is:

1. A backlash-free hydraulically actuated device comprising a first piston having a piston rod projecting from one end face thereof, said piston rod having a bore therein opening on the other end face of said first piston, a second piston having a piston rod projecting therefrom and slidably disposed within said bore, a cylinder, said first and second pistons being slidably disposed within said cylinder with the piston rods projecting therefrom, a sealing ring on each of said pistons slidably sealing against the cylindrical inner surface of said cylinder, first port means in said cylinder communicating with the interior thereof on one side of said pistons, second port means in said cylinder communicating with the interior thereof on the other side of said pistons, and a link member having one end thereof projecting into said bore at a point outside of said cylinder and the other end thereof adapted to be connected to a mechanism to be actuated by said pistons, said one end of the link member being clinched between the blind end of said bore and the end of the piston rod of said second piston to retain said pistons in spaced relation, and vent means formed between said piston rods for venting the space between said pistons to prevent hydraulic pressure from building up therebetween.

2. The invention as defined in claim 1 wherein said vent means comprises a vent port in the wall of said first piston rod outwardly of said cylinder communicating with said bore, and said piston rods forming an axially extending passageway therebetween having the outer end thereof communicating with said vent port and the inner end thereof communicating with the space between said pistons.

3. A backlash-free hydraulically actuated device comprising a housing having a chamber therein, a first actuator having a portion thereof extending within said chamber, a second actuator having a portion thereof extending into said chamber, means for movably mounting said actuators on said housing for movement relative thereto and for movement relative to one another, said portions of the actuators dividing said chamber into two parts, first port means in said housing communicating with one part of said chamber, second port means in said housing communicating with the other part of said chamber, a sealing element on each of said portions of the actuators slidably sealing against the inner surface of the wall of said chamber to seal off said parts from one another, a mechanism actuating member connected between said actuators outside of said housing, said member being clinched between said actuators in a manner to limit movement of said portions toward one another and to space said portions a predetermined distance apart from one another, and vent means in said actuators communicating with the space between said portions to prevent fluid pressure from building up therebetween.

References Cited in the file of this patent

UNITED STATES PATENTS

| | | |
|---|---|---|
| 540,492 | Humes | June 4, 1895 |
| 1,046,170 | Fuchs | Dec. 3, 1912 |
| 1,181,111 | Carter | May 2, 1916 |
| 2,349,170 | Jackman | May 16, 1944 |
| 2,806,451 | Vinkler et al. | Sept. 17, 1957 |
| 2,828,610 | Bruehl | Apr. 1, 1958 |
| 2,893,353 | Short et al. | July 7, 1959 |
| 2,896,413 | Hussey | July 28, 1959 |
| 2,961,015 | Randall | Nov. 22, 1960 |